(12) United States Patent
Jang et al.

(10) Patent No.: US 8,617,761 B2
(45) Date of Patent: *Dec. 31, 2013

(54) FUEL CELL HAVING CURRENT-COLLECTABLE MANIFOLD

(75) Inventors: Jae Hyuk Jang, Gyunggi-do (KR); Jong sik Yoon, Seoul (KR); Eon Soo Lee, Gyeongsangbuk-do (KR); Jong Ho Chung, Gyunggi-do (KR); Jae Hyoung Gil, Seoul (KR); Sung Han Kim, Seoul (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 546 days.

This patent is subject to a terminal disclaimer.

(21) Appl. No.: 12/565,681

(22) Filed: Sep. 23, 2009

(65) Prior Publication Data

US 2011/0033780 A1 Feb. 10, 2011

(30) Foreign Application Priority Data

Aug. 4, 2009 (KR) .................. 10-2009-0071633

(51) Int. Cl.
*H01M 2/20* (2006.01)
*H01M 8/24* (2006.01)

(52) U.S. Cl.
USPC ............................. 429/467; 429/466

(58) Field of Classification Search
USPC ............... 429/34, 466, 129, 458, 467
See application file for complete search history.

(56) References Cited

U.S. PATENT DOCUMENTS

| 3,402,230 | A | 9/1968 | White, Jr. |
| 5,338,623 | A | 8/1994 | Nachlas et al. |
| 5,549,983 | A | 8/1996 | Yamanis |
| 6,506,511 | B1 | 1/2003 | Lakeman et al. |
| 2002/0031702 | A1 | 3/2002 | Kimura et al. |
| 2004/0023101 | A1 | 2/2004 | Jacobson et al. |
| 2004/0175606 | A1 | 9/2004 | Komura et al. |
| 2005/0008916 | A1* | 1/2005 | Okamoto et al. ............... 429/31 |
| 2005/0037252 | A1 | 2/2005 | Pham |
| 2005/0214613 | A1 | 9/2005 | Sarkar et al. |
| 2006/0147778 | A1 | 7/2006 | Matsuzaki et al. |
| 2006/0153974 | A1 | 7/2006 | Matsuzaki et al. |
| 2007/0037028 | A1 | 2/2007 | Chiang et al. |
| 2007/0065701 | A1 | 3/2007 | Cable et al. |
| 2007/0099065 | A1 | 5/2007 | Rawson et al. |
| 2007/0141447 | A1 | 6/2007 | Crumm et al. |

(Continued)

FOREIGN PATENT DOCUMENTS

| CN | 1653638 A | 8/2005 |
| EP | 0 562 724 A2 | 9/1993 |

(Continued)

*Primary Examiner* — Patrick Ryan
*Assistant Examiner* — Lucas J. O'Donnell
(74) *Attorney, Agent, or Firm* — Blakely Sokoloff Taylor & Zafman LLP (57) ABSTRACT

A fuel cell includes a cell unit and a manifold capable of collecting electric current. The cell unit includes a tube support composed of a conductive material, a unit cell laminated on an outer surface of the tube support, and a current collection layer laminated on an outer surface of the unit cell. The manifold includes an inner tube supplying gas into and electrically connected with the tube support, and an outer tube provided outside the inner tube and electrically connected with the current collection layer. By the provision of a current-collectable manifold, a separate metal form or metal wire for current collection is not required.

12 Claims, 7 Drawing Sheets

(56) References Cited

U.S. PATENT DOCUMENTS

| | | |
|---|---|---|
| 2007/0269693 A1 | 11/2007 | Perry |
| 2008/0044718 A1 | 2/2008 | Wang et al. |
| 2008/0118812 A1 | 5/2008 | Kawakami et al. |
| 2008/0254335 A1 | 10/2008 | Torgerson et al. |
| 2008/0268323 A1 | 10/2008 | Tucker et al. |
| 2009/0081516 A1 | 3/2009 | Watanabe et al. |
| 2009/0155660 A1* | 6/2009 | Yu et al. .......................... 429/31 |
| 2010/0086824 A1* | 4/2010 | Homel et al. .................... 429/30 |
| 2011/0053032 A1 | 3/2011 | Gil |
| 2011/0059383 A1 | 3/2011 | Taniguchi |
| 2011/0065019 A1 | 3/2011 | Taniguchi et al. |

FOREIGN PATENT DOCUMENTS

| | | |
|---|---|---|
| EP | 1 482 590 A1 | 12/2004 |
| EP | 1 603 183 A1 | 12/2005 |
| EP | 1 624 521 A1 | 2/2006 |
| EP | 1 994 594 B1 | 11/2008 |
| EP | 2 063 479 A1 | 5/2009 |
| JP | 07-235316 A | 9/1995 |
| JP | 08-055630 A | 2/1996 |
| JP | 2000-195535 A | 7/2000 |
| JP | 2001-176523 A | 6/2001 |
| JP | 2002-289249 A | 10/2002 |
| JP | 2004-273262 A | 9/2004 |
| JP | 2005-0166470 A | 6/2005 |
| JP | 2005-524955 A | 8/2005 |
| JP | 2007-095442 A | 4/2007 |
| JP | 2007-149618 A | 6/2007 |
| JP | 2007-220632 A | 8/2007 |
| JP | 2007-273196 A | 10/2007 |
| JP | 2007-273433 A | 10/2007 |
| JP | 2008-071710 A | 3/2008 |
| JP | 2008-071712 A | 3/2008 |
| JP | 2010-282870 A | 12/2010 |
| KR | 10-2004-0104657 A | 12/2004 |
| KR | 100738308 B1 | 7/2007 |
| KR | 10-2007-0083893 A | 8/2007 |
| WO | WO 2004/082058 A1 | 9/2004 |
| WO | WO 2005/013018 A2 | 2/2005 |
| WO | WO 2007/099095 A1 | 9/2007 |
| WO | WO 2008/032773 A1 | 3/2008 |

* cited by examiner

FIG.1

Prior art

FUEL CELL HAVING CURRENT-COLLECTABLE MANIFOLD

CROSS REFERENCE TO RELATED APPLICATION

This application claims the benefit of Korean Patent Application No. 10-2009-0071633, filed on Aug. 4, 2009, entitled "Fuel cell comprising manifold capable of current collecting", which is hereby incorporated by reference in its entirety into this application.

BACKGROUND OF THE INVENTION

1. Technical Field

The present invention relates, in general, to a fuel cell having a manifold which is able to collect electric current.

2. Description of the Related Art

Generally, a fuel cell is a device in which the chemical energy of a fuel (e.g., hydrogen, LNG, LPG or the like) and air is converted directly into electrical energy and heat by an electrochemical reaction. Unlike existing electricity-generation technology which requires the processes of combusting the fuel, generating steam, driving a turbine, and driving a generator, the fuel cells do not need to perform the combustion process nor do they need a driving device, so that they are a next generation technology which generates energy in high efficiency without inducing environmental problems.

Figure 1:
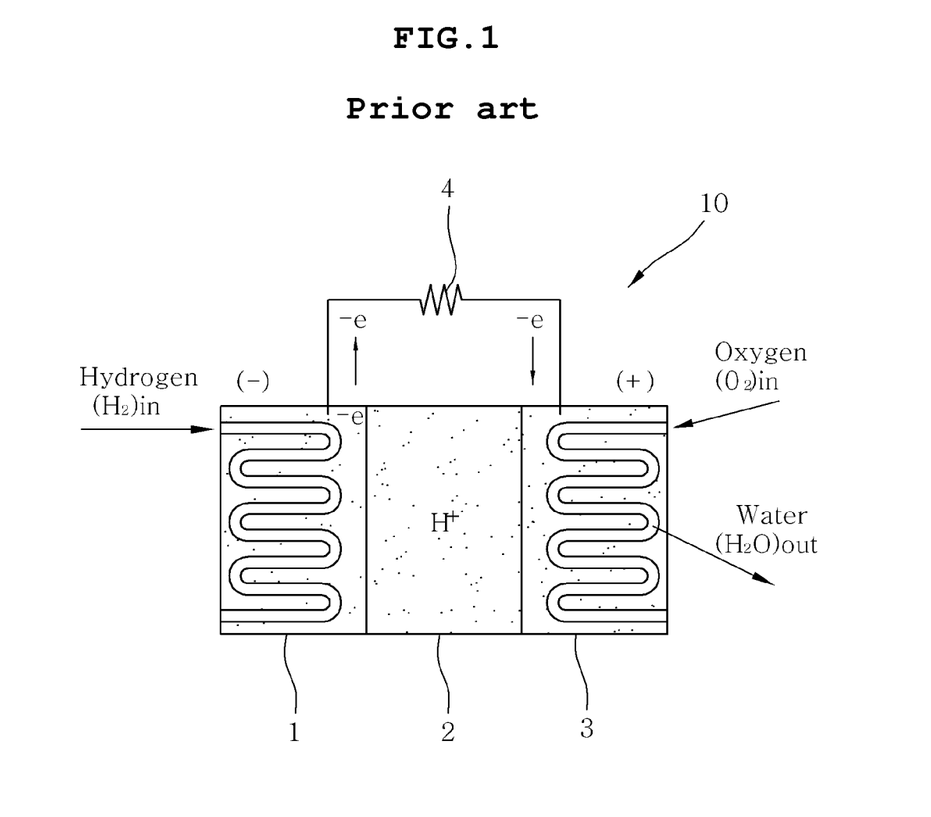
FIG. 1 is a view illustrating the principle of operation of a conventional fuel cell.

FIG. 1 is a view illustrating the principle of operation of a fuel cell.

Referring to FIG. 1, an anode 1 is supplied with hydrogen ($H_2$) and decomposes it into hydrogen ions ($H^+$) and electrons ($e^-$). The hydrogen ions are delivered to a cathode 3 via an electrolyte 2. Electrons travel through an external circuit to thereby generate an electric current. At the cathode, the hydrogen ions, electrons and oxygen in the air react with each other to produce water. A chemical reaction at the fuel cell 10 can be expressed by the following reaction 1:

Reaction 1

$$\text{Anode 1: } H_2 \rightarrow 2H^+ + 2e^-$$
$$\text{Cathode 3: } \frac{1}{2}O_2 + 2H^+ + 2e^- \rightarrow H_2O$$
$$\text{Total Reaction: } H_2 + \frac{1}{2}O_2 \rightarrow H_2O$$

That is, electrons released from the anode 1 travel through the external circuit and generate electric current, thereby implementing the function of a cell. Such a fuel cell 10 has advantages in that it can generate electricity by being operated in a low-noise, no-vibration manner or the like, without emitting air-polluting materials, such as $SO_x$, $NO_x$ or the like, and $CO_2$.

Meanwhile, fuel cells are classified into a diversity of types including Phosphoric Acid Fuel Cells (PAFCs), Alkaline Fuel Cells (AFCs), Polymer Electrolyte Membrane Fuel Cells (PEMFCs), Direct Methanol Fuel Cells (DMFCs), Solid Oxide Fuel Cells (SOFCs) and the like. The SOFCs are able to implement high efficiency power generation and combined power generation using e.g. coal gas-fuel cell-gas turbine or the like, and are suitable for small and large power plants or a decentralized power source because they are of a diversity of capabilities of power generation. Thus, SOFCs are an essential power generation technology for our introduction into the hydrogen-based economy and society of the future.

However, in order for the SOFCs to be commercialized, there is a problem to be solved in the processes of current-collection and manifold connection.

In the prior art, the current-collection was performed by the construction in which a metal form is provided in a cell and a metal wire is provided outside the cell. In the construction, there was a problem in that, as a cell is made larger, the amount of an expensive metal wire required and therefore the manufacturing cost are increased and the structure becomes complex, and mass production thereof is difficult to implement. Further, if a problem occurs in a cell and the cell has to be replaced with a new one, all of metal form and metal wire should be removed and the new metal form and metal wire have to be installed again in the cell, which is a problematic and complex process.

Another problem exists in the connection between a manifold and a cell. The manifold supplying hydrogen or air to the cell is in general composed of metal, whereas the cell is composed of ceramic. Thus, in order to combine heterogeneous metal and ceramic with each other, a brazing process is conventionally used. However, the brazing process has a problem in that depending upon a rate of increasing voltage applied to an induction coil, duration time of voltage applied, and a cooling condition after brazing, a clogging in the cell or weld defects may occur.

SUMMARY OF THE INVENTION

Accordingly, the present invention has been made keeping in mind the above problems occurring in the related art, and the present invention is intended to propose a fuel cell having an additive function of current collection without a separate current collecting unit.

In order to achieve the above object, according to one aspect of the present invention, there is provided a fuel cell including: a cell unit; and a manifold capable of collecting electric current, the cell unit including: a tube support composed of a conductive material; a unit cell laminated on an outer surface of the tube support; and a current collection layer laminated on an outer surface of the unit cell, the manifold including: an inner tube supplying gas into and electrically connected with the tube support; and an outer tube provided outside the inner tube and electrically connected with the current collection layer.

Here, the electrical connection between the tube support and the inner tube may be provided in such a manner that an inner fastening section extending from an end of the tube support and an end of the inner tube are screw fastened to each other.

Further, an outer fastening section may be provided on an end of the current collection layer and electrically connected with the current collection layer, and the electrical connection between the current collection layer and the outer tube may be provided in such a manner that the outer fastening section and an end of the outer tube are screw fastened to each other.

Further, the unit cell may include an anode, an electrolyte, and a cathode, which are laminated in the order named on the outer surface of the tube support, and the inner tube may supply fuel into the tube support.

Further, the unit cell may include an anode, an interlayer, an electrolyte, an interlayer, and a cathode, which are laminated in the order named on the outer surface of the tube support, and the inner tube may supply fuel into the tube support.

Further, the unit cell may include a cathode, an electrolyte, and an anode, which are laminated in the order named on the outer surface of the tube support, and the inner tube may supply air or oxygen into the tube support.

Further, the unit cell may include a cathode, an interlayer, an electrolyte, an interlayer, and an anode, which are laminated in the order named on the outer surface of the tube support, and the inner tube may supply air or oxygen into the tube support.

Further, an insulating layer may be further provided on an end of the unit cell so as to cut off electrical contact between the unit cell and the inner tube.

According to another embodiment of the present invention, there is provided a fuel cell including: a cell unit; and a manifold capable of collecting electric current, the cell unit including: a tube support composed of a conductive material; a unit cell laminated on an outer surface of the tube support; and a current collection layer laminated on an outer surface of the unit cell, the manifold including: a gas supply tube supplying gas into the tube support; an inner tube provided outside the gas supply tube so as to discharge the gas and electrically connected with the tube support; and an outer tube provided outside the inner tube and electrically connected with the current collection layer.

Here, the electrical connection between the tube support and the inner tube may be provided in such a manner that an inner fastening section extending from an end of the tube support and an end of the inner tube are screw fastened to each other.

Further, an outer fastening section may be provided on an end of the current collection layer and electrically connected with the current collection layer, and the electrical connection between the current collection layer and the outer tube may be provided in such a manner that the outer fastening section and an end of the outer tube are screw fastened to each other.

Further, the unit cell may include an anode, an electrolyte, and a cathode, which are laminated in the order named on the outer surface of the tube support, and the gas supply tube may supply fuel into the tube support.

Further, the unit cell may include an anode, an interlayer, an electrolyte, an interlayer, and a cathode, which are laminated in the order named on the outer surface of the tube support, and the gas supply tube may supply fuel into the tube support.

Further, the unit cell may include a cathode, an electrolyte, and an anode, which are laminated in the order named on the outer surface of the tube support, and the gas supply tube may supply air or oxygen into the tube support.

Further, the unit cell may include a cathode, an interlayer, an electrolyte, an interlayer, and an anode, which are laminated in the order named on the outer surface of the tube support, and the gas supply tube may supply air or oxygen into the tube support.

Further, an insulating layer may be further provided on an end of the unit cell so as to cut off electrical contact between the unit cell and the inner tube.

According to the construction of the present invention, the current collectable manifold is adapted to the fuel cell, so that a separate metal form or metal wire for current collection is not required.

Further, the manifold can supply gas (fuel, air or the like) while collecting electric current.

Further, if a problem occurs in a cell, the cell can be easily replaced through mechanical coupling with and decoupling from the manifold without removing the metal form or the metal wire for current collection.

Further, the cell and the manifold are screw fastened to each other so that they can be completely sealed with each other even without using a brazing process.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Reference will now be made in greater detail to a preferred embodiment of the invention, an example of which is illustrated in the accompanying drawings. Wherever possible, the same reference numerals will be used throughout the drawings and the description to refer to the same or like parts. In describing the present invention, if it is determined that the detailed description on the related known technology makes the gist of to the present invention unnecessarily ambiguous, the detailed description will be omitted.

Prior to making the description, it is noted that terms or words expressed in the specification and claims should not be limited to or construed by their conventional or dictionary meanings, but should be understood as meanings and concepts conforming with the technical spirits of the present invention because the inventor can properly define the concepts of terms or words used in order to elucidate his/her invention in the best manner.

Figure 2:
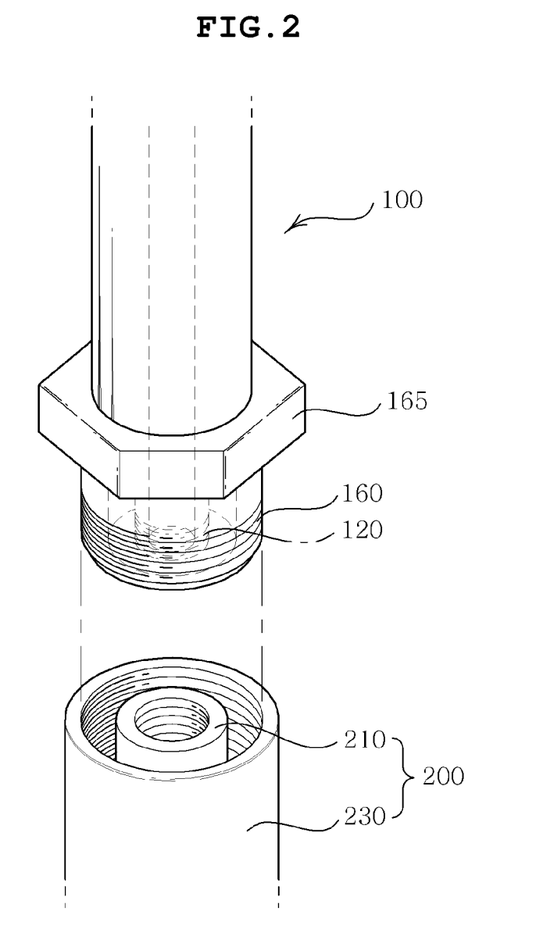
FIG. 2 is a perspective view illustrating a fuel cell having a current-collectable manifold according to a first embodiment of the present invention.
Figure 3:
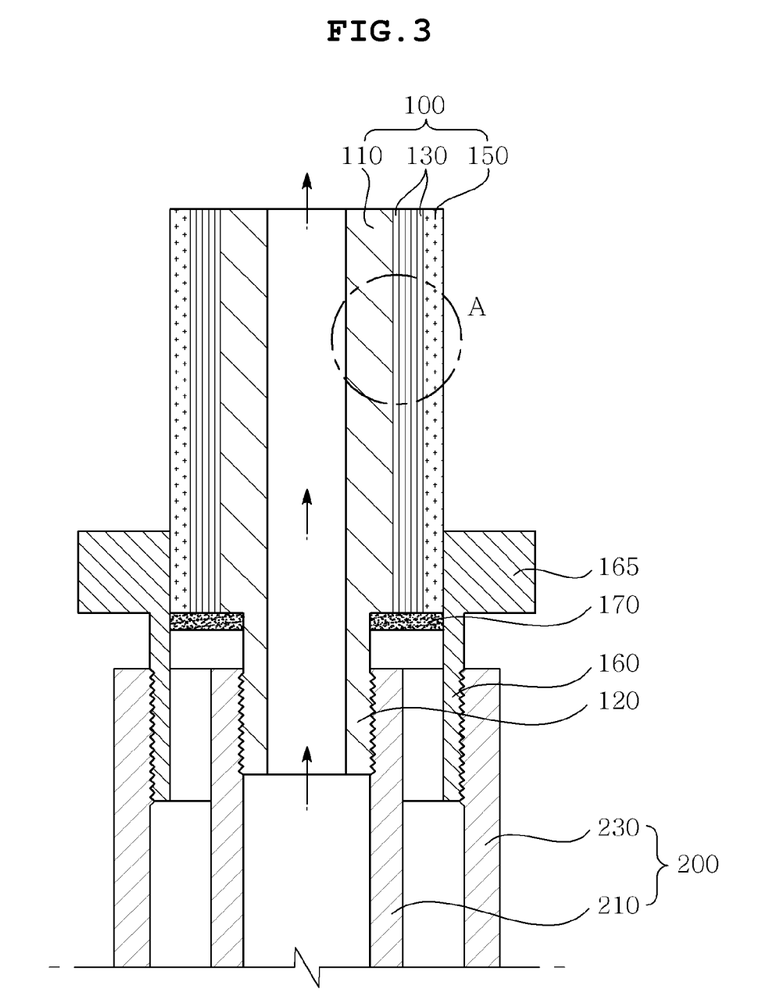
FIG. 3 is a cross-sectional view illustrating the fuel cell shown in FIG. 2.

FIG. 2 is a perspective view illustrating a fuel cell having a current-collectable manifold according to a first embodiment of the present invention, and FIG. 3 is a cross-sectional view illustrating the fuel cell shown in FIG. 2.

As illustrated in FIGS. 2 and 3, the fuel cell having the current-collectable manifold includes a cell unit 100 and a current-collectable manifold 200. The cell unit 100 includes a tube support 110 composed of a conductive material, a unit cell 130 laminated on an outer surface of the tube support 110, and a current collection layer 150 laminated on an outer surface of the unit cell 130. The manifold 200 includes an inner tube 210 supplying gas into and electrically connected with the tube support 110, and an outer tube 230 provided outside the inner tube 210 and electrically connected with the current collection layer 150.

The tube support 110 and the current collection layer 150 of the cell unit 100 serve to collect electric current at the innermost and outermost layers, respectively, and the unit cell 130 between the tube support 110 and the current collection layer 150 serves to create electric current.

The tube support 110 basically serves to support the unit cell 130 and supply gas (fuel or air) to an electrode. Thus, the tube support should have support force capable of supporting the unit cell 130 and gas permeability (porosity) with which gas can be passed to the electrode.

The tube support 110 serving to collect current should be composed of a conductive material. The tube support 110 collects current which is created from an electrode (an anode 131 or a cathode 139) which is laminated at the innermost portion of the unit cell and contacts the tube support 110. An inner fastening section 120 extending from an end of the tube support 110 is coupled with the inner tube 210 of the manifold so as to transfer collected current to the inner tube 210 of the manifold.

The current collection layer 150 collects current created from an electrode (an anode 131 or a cathode 139) which is laminated on the outermost portion of the unit cell and contacts the current collection layer 150. Thus, the current collection layer 150 may be formed by coating conductive material onto the unit cell 130. Further, an outer fastening section 160 is provided on an end of the current collection layer 150 such that it is electrically connected with the current collection layer 150. The outer fastening section 160 is coupled with the outer tube 230 of the manifold so as to transfer collected current to the outer tube 230 of the manifold.

The manifold 200 serves to both supply gas (fuel or air) to the cell unit 100 and receive current from the tube support 110 and the current collection layer 150, completing the current collection in the fuel cell, through forming its construction into a double structure.

Here, the double structure of the manifold 200 includes the inner tube 210 and the outer tube provided outside the inner tube 230. The manifold 200 may be composed of a conductive material because it should serve as current collection means.

The inner tube 210 of the manifold supplies gas (fuel or air) to the tube support 110 and is electrically connected with the tube support 110. Particularly, the inner fastening section 120, which extends from one end of the tube support 110, and the inner tube 210 of the manifold are provided on their corresponding sides with external and internal screws. When the inner fastening section 120 and the inner tube 210 are coupled using screw engagement between the external and internal screws, they are to be electrically connected with each other. Further, such a screw engagement also insures complete sealing between to the inner tube 210 of the manifold and the tube support 110, thereby preventing gas from leaking.

Meanwhile, when the inner fastening section 120 and the inner tube 210 of the manifold are coupled with each other, one end of the inner tube 210 of the manifold may come into electrical contact with one end of the unit cell 130, thereby causing the anode 131 and the cathode 139 to short-circuit. To prevent this, an insulation film 170 may be provided in an annular form on one end of the unit cell 130.

The outer tube 230 of the manifold is electrically connected with the current collection layer 150. Particularly, an outer fastening section 160 is provided on one end of the current collection layer 150 in such a manner as to be electrically connected with the current collection layer 150. The outer fastening section 160 and the outer tube 230 of the manifold are provided on their corresponding sides with external and internal screws. When the outer fastening section and the outer tube are coupled using the screw engagement between the external and internal screws, the current collection layer 150 and the outer tube 230 of the manifold are to be electrically connected with each other.

A hexagonal flange 165 is formed on the outer fastening section 160. It is preferred that the combination of the external and internal screws be provided such that upon rotating the hexagonal flange using a tool such as a wrench, pliers or the like, the engagements between the inner fastening section 120 and the inner tube 210 of the manifold and between the outer fastening section 160 and the outer tube 230 of the manifold can be implemented at the same time. In this case, if a problem occurs in the cell unit 100, the hexagonal flange is rotated in an opposite direction to the above direction so as to release the engagements, and the cell unit 100 can be easily replaced.

Figure 4:
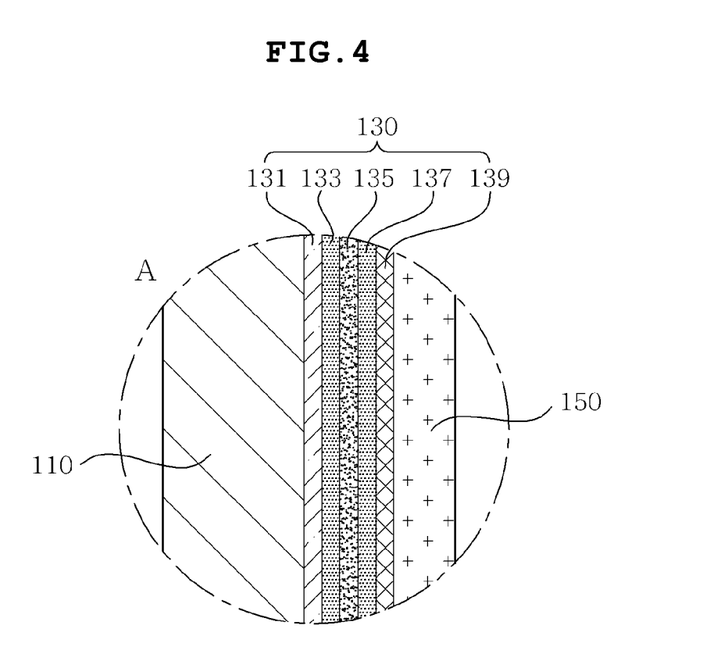
FIGS. 4 and 5 are enlarged views of a section "A" shown in FIG. 3.
Figure 5:
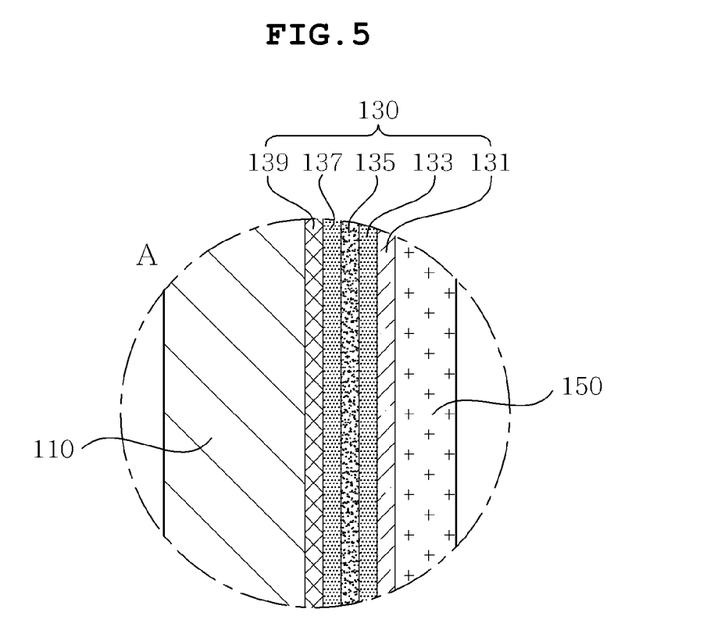

FIGS. 4 and 5 are enlarged views of a section "A" shown in FIG. 3, wherein the positions of the anode 131 and the cathode 139 are different in the drawings.

Referring to FIG. 4, the unit cell 130 includes the anode 131, an interlayer 133, an to electrolyte 135, an interlayer 137, and the cathode 139, which are laminated in the order named on the outer surface of the tube support 110. Since the anode 131 abuts on the tube support 110, the inner tube 210 of the manifold supplies fuel into the tube support 110 so that the fuel passes through the porous tube support 110 to the anode 131. Since the cathode 139 is provided on an outermost portion of the unit cell 130, an air environment is created outside the cell unit 100, thereby supplying air or oxygen to the cathode 139. When the anode 131 is supplied with fuel and the cathode 139 is supplied with air or oxygen, a chemical reaction occurs in the unit cell so as to create electric current. Here, negative current created from the anode 131 is collected on the inner tube 210 of the manifold via the tube support 110, and positive current created from the cathode 139 is collected on the outer tube 230 of the manifold via the current collection layer 150.

Meanwhile, the interlayer 133 and 137 is preferably provided between the anode 131 and the electrolyte 135 and between the cathode 139 and the electrolyte 135. The interlayer 133 and 137 serves to reduce a difference in thermal expansion coefficient created on an interface between the electrode and the electrolyte 135, speeding up flowing of ions between them, which finally improves the performance of the fuel cell. However, since the interlayer 133 and 137 is not an essential element for current creation, the unit cell 130 may include the anode 131, the electrolyte 135, and the cathode 139, which are laminated in the order named on the outer surface of the tube support 110, excluding the interlayer 133 and 137.

Here, the method of forming the anode 131, the electrolyte 135, and the cathode 139 may be as follows. The anode 131 can be prepared in such a manner as to coat NiO—YSZ (Yttria Stabilized Zirconia) using slip coating or plasma spray coating and then heat treat the resulting object in a temperature ranging from 1200° C. to 1300° C. The electrolyte 135 can be prepared in such a manner as to coat Yttria Stabilized Zirconia (YSZ), Scandium Stabilized Zirconia (ScSZ), GdO-doped CeO (GDC), $CeLaO_2$(LDC) or the like using slip coating or plasma spray coating followed by sintering the resulting object at a temperature to ranging from 1300° C. to 1500° C. The cathode 139 can be prepared in such a manner as to coat Strontium doped Lanthanum Manganite (LSM), (La,Sr)(Co,Fe)$O_3$(LSCF) or the like using slip coating or plasma spray coating followed by sintering the resulting object at a temperature ranging from 1200° C. to 1300° C.

Referring to FIG. 5, unlike the unit cell 130 shown in FIG. 4, the unit cell 130 includes the cathode 139, an interlayer 137, an electrolyte 135, an interlayer 133, and the anode 131, which are laminated in the order named on the outer surface of the tube support 110. Since the cathode 139 abuts on the tube support 110, the inner tube 210 of the manifold supplies air or oxygen into the tube support 110 so that the air or oxygen passes through the porous tube support 110 to the cathode 139. Since the anode 131 is provided on an outermost portion of the unit cell 130, a fuel environment is created outside the cell unit 100, thereby supplying fuel to the anode 131. When the cathode 139 is supplied with air or oxygen and the anode 131 is supplied with fuel, a chemical reaction occurs in the unit cell so as to create electric current. Here, positive current created from the cathode 139 is collected on the inner tube 210 of the manifold via the tube support 110, and negative current created from the anode 131 is collected on the outer tube 230 of the manifold via the current collection layer 150.

Meanwhile, as set forth before, the interlayer 133 and 137 is preferably provided between the anode 131 and the electrolyte 135 and between the cathode 139 and the electrolyte 135. However, since the interlayer 133 and 137 is not an essential element for current creation, the unit cell 130 may include the cathode 139, the electrolyte 135, and the anode 131, which are laminated in the order named on the outer surface of the tube support 110, excluding the interlayer 133 and 137.

Figure 6:
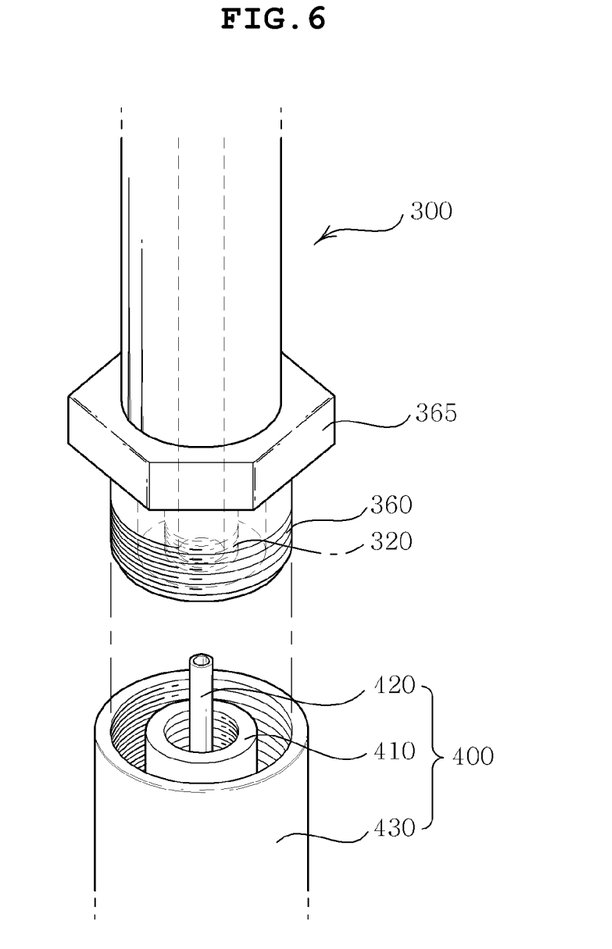
FIG. 6 is a perspective view illustrating a fuel cell having a current-collectable manifold according to a second embodiment of the present invention.
Figure 7:
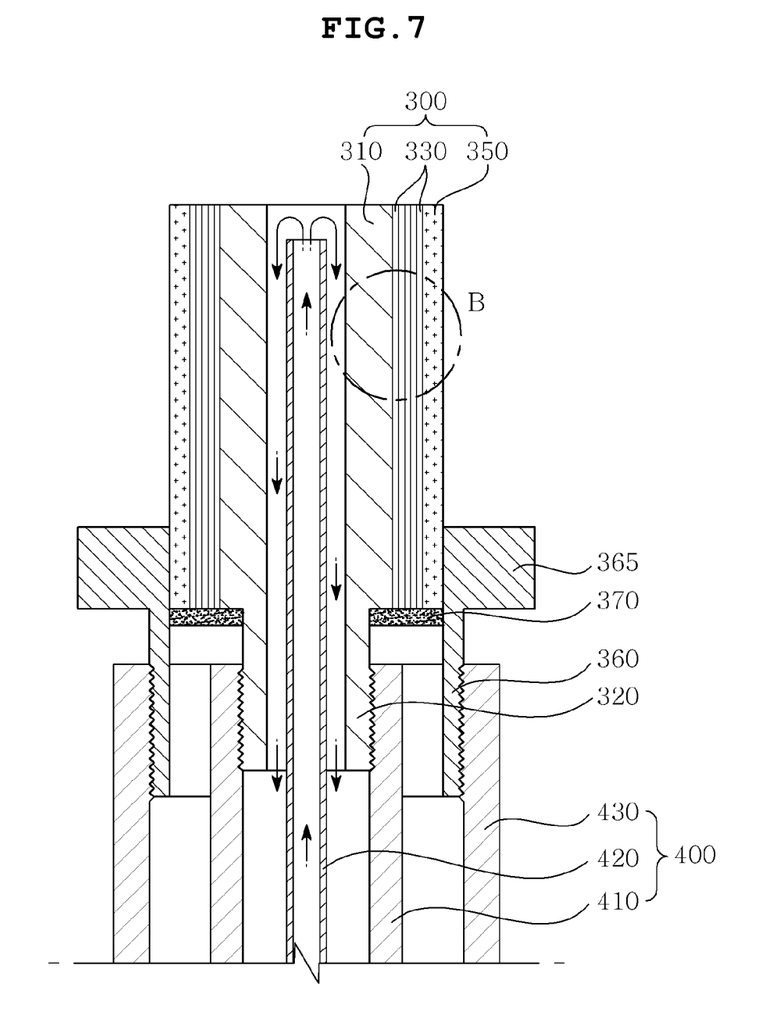
FIG. 7 is a cross-sectional view illustrating the fuel cell shown in FIG. 6.

FIG. 6 is a perspective view illustrating a fuel cell having a current-collectable manifold according to a second embodiment of the present invention, and FIG. 7 is a cross-sectional view illustrating the fuel cell shown in FIG. 6.

As illustrated in FIGS. 6 and 7, the fuel cell having the current-collectable manifold includes a cell unit 300 and a current-collectable manifold 400. The cell unit 300 includes a tube support 310 composed of a conductive material, a unit cell 330 laminated on an outer surface of the tube support 310, and a current collection layer 350 laminated on an outer surface of the unit cell 330. The manifold 400 includes a gas supply tube 420 supplying gas into the tube support 310, an inner tube 410 provided outside the gas supply tube 420 so as to discharge gas and forming an electrical connection with the tube support 310, and an outer tube 430 provided outside the inner tube 410 and electrically connected with the current collection layer 350.

A major difference of the present embodiment from the first embodiment concerns the presence or absence of the gas supply tube 420. In this embodiment, the gas supply tube 420 serves to supply gas (fuel or air), whereas in the first embodiment, the inner tube 410 of the manifold implements such a function. In the first embodiment, gas (fuel or air) supplied through the inner tube 410 of the manifold is discharged out of the cell unit 300 via an opening formed on another end of the tube support 310. However, according to the present embodiment, as illustrated in FIG. 7, another end of the tube support 310 is closed, so that gas supplied through the gas supply tube 420 is discharged out of the cell unit 300 via the inner tube 410 of the manifold. In particular, the gas supply tube 420 is preferably constructed such that it extends into the tube support 410 so as to uniformly supply gas into the tube support 310. Here, the extension length of the gas supply tube 420 can be adjusted in consideration of the pressure of gas supplied, a diameter ratio between the gas supply tube 420 and the tube support 310, or the like.

The tube support 310 and the current collection layer 350 of the cell unit 300 serve to collect electric current at innermost and outermost layers, respectively, and the unit cell 330 between the tube support 310 and the current collection layer 350 serves to create electric current. Here, the tube support 310 and the current collection layer 350 have the same functions as those of the tube support and the current collection layer according to the first embodiment, respectively. Further, their composition material is the same material as those of the first embodiment.

The manifold 400 serves to both supply gas (fuel or air) to the cell unit 300 and receive current from the tube support 310 and the current collection layer 350, completing the current collection in the fuel cell, through forming its construction into a triple structure.

Here, the triple structure of the manifold 400 includes the innermost gas supply tube 420, the outermost outer tube 430 of the manifold, and the inner tube 410 of the manifold provided between the gas supply tube 420 and the outer tube 430 of the manifold. The inner and outer tubes 410 and 430 of the manifold may be composed of a conductive material because they should serve as current collection means. Further, unlike the first embodiment, the inner tube 410 of the manifold serves to discharge supplied gas (fuel or air) out of the cell unit 300.

Examining the electrical connection between the tube support 310 and the inner tube 410 of the manifold, an inner fastening section 320, which extends from one end of the tube support 310, and the inner tube 410 of the manifold are provided on their corresponding sides with external and internal screws, so that, when the inner fastening section 320 and the inner tube 410 are coupled using screw engagement between the external and internal screws, they are to be electrically connected with each other. Further, such a screw engagement also insures complete sealing between the inner tube 410 of the manifold and the tube support 310, thereby preventing gas from leaking.

Meanwhile, when the inner fastening section 320 and the inner tube 410 of the manifold are coupled with each other, one end of the inner tube 410 of the manifold may come into electrical contact with one end of the unit cell 330, thereby causing an anode 331 and a cathode 339 to short-circuit. To prevent this, an insulation film 370 may be provided in an annular form on one end of the unit cell 330.

The outermost tube 430 of the manifold is electrically connected with the current collection layer 350. Particularly, an outer fastening section 360 is provided on one end of the current collection layer 350 in such a manner as to be electrically connected with the current collection layer 350. The outer fastening section 360 and the outer tube 430 of the manifold are provided on their corresponding sides with external and internal screws. When the outer fastening section 360 and the outer tube 430 are coupled using the screw engagement between the external and internal screws, the current collection layer 350 and the outer tube 430 of the manifold are to be electrically connected with each other.

As set forth before, a hexagonal flange 365 is formed on the outer fastening section 360. It is preferred that the combination of the external and internal screws be provided such that upon rotating the hexagonal flange using a tool such as a wrench, pliers or the like, the engagements between the inner fastening section 320 and the inner tube 410 of the manifold and between the outer fastening section 360 and the outer tube 430 of the manifold can be implemented at the same time.

Figure 8:
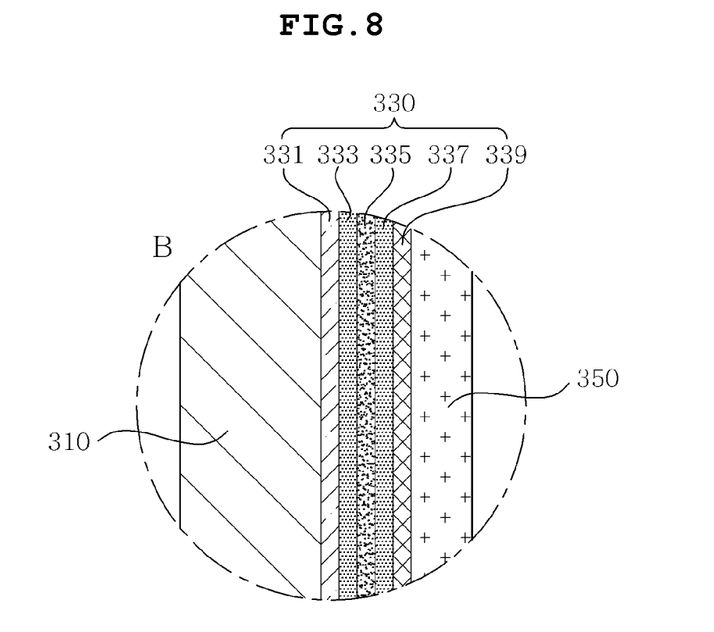
FIGS. 8 and 9 are enlarged views of a section "B" shown in FIG. 7.
Figure 9:
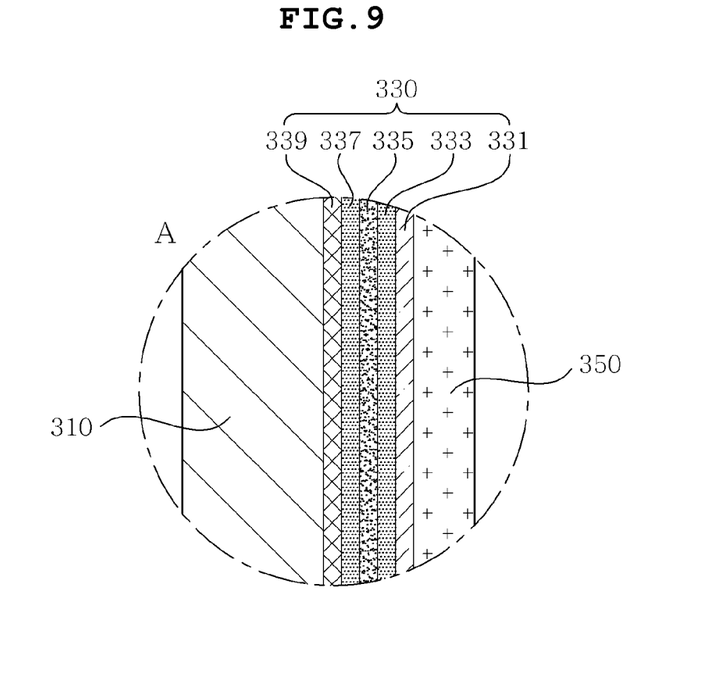

FIGS. 8 and 9 are enlarged views of a section "B" shown in FIG. 7, wherein the positions of the anode 331 and the cathode 339 are different in the drawings.

Referring to FIG. 8, the unit cell 130 includes the anode 331, an interlayer 333, an electrolyte 335, an interlayer 337, and the cathode 339, which are laminated in the order named on the outer surface of the tube support 310. Since the anode 331 abuts on the tube support 310, the gas supply tube 420 supplies fuel into the tube support 310 so that the fuel passes through the porous tube support 310 to the anode 331. Since the cathode 339 is provided on an outermost portion of the unit cell 330, an air environment is created outside the cell unit 300, thereby supplying air or oxygen to the cathode 339. When the anode 331 is supplied with fuel and the cathode 339 is supplied with air or oxygen, a chemical reaction occurs in the unit cell so as to create electric current. Here, negative current created from the anode 331 is collected on the inner tube 410 of the manifold via the tube support 310, and to positive current created from the cathode 339 is collected on the outer tube 430 of the manifold via the current collection layer 350.

Meanwhile, like the first embodiment, an interlayer 333 and 137 is preferably provided between the anode 331 and the electrolyte 335 and between the cathode 339 and the electrolyte 335. However, since the interlayer 333 and 337 is not an essential element for current creation, the unit cell 330 may include the anode 331, the electrolyte 335, and the cathode 339, which are laminated in the order named on the outer surface of the tube support 310, excluding the interlayer 333 and 337.

Further, the method of forming the anode 331, the electrolyte 335, and the cathode 339 is carried out in the same manner as that of the first embodiment, so a description thereof will be omitted.

Referring to FIG. 9, unlike the unit cell 330 shown in FIG. 8, the unit cell 330 includes the cathode 339, an interlayer 337, an electrolyte 335, an interlayer 333, and the anode 331, which are laminated in the order named on the outer surface of the tube support 310. Since the cathode 339 abuts on the tube support 310, the gas supply tube 420 supplies air or oxygen into the tube support 310 so that the air or oxygen passes through the porous tube support 310 to the cathode 339. Since the anode 331 is provided on an outermost portion of the unit cell 330, a fuel environment is created outside the cell unit 300, thereby supplying fuel to the anode 331. When the cathode 339 is supplied with air or oxygen and the anode 331 is supplied with fuel, a chemical reaction occurs in the unit cell so as to create electric current. Here, positive current created from the cathode 339 is collected on the inner tube 410 of the manifold via the tube support 310, and negative current created from the anode 331 is collected on the outer tube 430 of the manifold via the current collection layer 350.

Meanwhile, as set forth before, the interlayer 333 and 337 is preferably provided between the anode 331 and the electrolyte 335 and between the cathode 339 and the electrolyte 335. However, since the interlayer 333 and 337 is not an essential element for current creation, the unit cell 330 may include the cathode 339, the electrolyte 335, and the anode 331, which are laminated in the order named on the outer surface of the tube support 310, excluding the interlayer 333 and 337.

Although preferred embodiments of the present invention have been described for illustrative purposes, those skilled in the art will appreciate that the present invention is not limited thereto, but various modifications, additions and substitutions are possible, without departing from the scope and spirit of the invention as disclosed in the accompanying claims. Particularly, while preferred embodiments of the invention have been described with reference to SOFCs, the present invention is not limited thereto, but can be adapted to all fuel cells which include a tube support and a manifold.

What is claimed is:

1. A fuel cell comprising:
a cell unit and a manifold capable of collecting electric current, the cell unit including: a tube support composed of a conductive material and having an inner fastening section extending from an end of the tube support;
a tubular unit cell laminated on an outer surface of the tube support;
a current collection layer laminated on an outer surface of the tubular unit cell; and
an annular insulating layer provided on an end of the tubular unit cell, and the manifold including: an inner tube supplying gas into the tube support and electrically connected with the inner fastening section of the tube support; and an outer tube provided outside the inner tube and electrically connected with the current collection layer,
wherein the annular insulating layer is provided on an end of the tubular unit cell so as to cut off electrical contact between the tubular unit cell and the inner tube, and the inner fastening section and an end of the inner tube are screw fastened to each other so as to come into electrical connection.

2. The fuel cell as set forth in claim 1, wherein an outer fastening section is provided on an end of the current collection layer and electrically connected with the current collection layer, and wherein the electrical connection between the current collection layer and the outer tube is provided in such a manner that the outer fastening section and an end of the outer tube are screw fastened to each other.

3. The fuel cell as set forth in claim 1, wherein the tubular unit cell includes an anode, an electrolyte, and a cathode, which are laminated in the order named on the outer surface of the tube support, and wherein the inner tube supplies fuel into the tube support.

4. The fuel cell as set forth in claim 1, wherein the tubular unit cell includes an anode, an interlayer, an electrolyte, an interlayer, and a cathode, which are laminated in the order named on the outer surface of the tube support, and wherein the inner tube supplies fuel into the tube support.

5. The fuel cell as set forth in claim 1, wherein the unit cell includes a cathode, an electrolyte, and an anode, which are laminated in the order named on the outer surface of the tube support, and wherein the inner tube supplies air or oxygen into the tube support.

6. The fuel cell as set forth in claim 1, wherein the tubular unit cell includes a cathode, an interlayer, an electrolyte, an interlayer, and an anode, which are laminated in the order named on the outer surface of the tube support, and wherein the inner tube supplies air or oxygen into the tube support.

7. A fuel cell comprising:
a cell unit and a manifold capable of collecting electric current, the cell unit including:
a tube support composed of a conductive material and having an inner fastening section extending from an end of the tube support;
a tubular unit cell laminated on an outer surface of the tube support;
a current collection layer laminated on an outer surface of the tubular unit cell; and
an annular insulating layer provided on an end of the tubular unit cell, and
the manifold including: a gas supply tube supplying gas into the tube support; an inner tube provided outside the gas supply tube so as to discharge the gas and forming an electrical connection with the inner fastening section of the tube support; and an outer tube provided outside the inner tube and electrically connected with the current collection layer,
wherein the annular insulating layer is provided on an end of the tubular unit cell so as to cut off electrical contact between the tubular unit cell and the inner tube, and the inner fastening section and an end of the inner tube are screw fastened to each other so as to come into electrical connection.

8. The fuel cell as set forth in claim 7, wherein an outer fastening section is provided on an end of the current collection layer and electrically connected with the current collection layer, and wherein the electrical connection between the current collection layer and the outer tube is provided in such a manner that the outer fastening section and an end of the outer tube are screw fastened to each other.

9. The fuel cell as set forth in claim 7, wherein the tubular unit cell includes an anode, an electrolyte, and a cathode, which are laminated in the order named on the outer surface of the tube support, and wherein the gas supply tube supplies fuel into the tube support.

10. The fuel cell as set forth in claim 7, wherein the tubular unit cell includes an anode, an interlayer, an electrolyte, an interlayer, and a cathode, which are laminated in the order named on the outer surface of the tube support, and wherein the gas supply tube supplies fuel into the tube support.

11. The fuel cell as set forth in claim 7, wherein the tubular unit cell includes a cathode, an electrolyte, and an anode, which are laminated in the order named on the outer surface of the tube support, and wherein the gas supply tube supplies air or oxygen into the tube support.

12. The fuel cell as set forth in claim 7, wherein the tubular unit cell includes a cathode, an interlayer, an electrolyte, an interlayer, and an anode, which are laminated in the order named on the outer surface of the tube support, and wherein the gas supply tube supplies air or oxygen into the tube support.

* * * * *